UNITED STATES PATENT OFFICE.

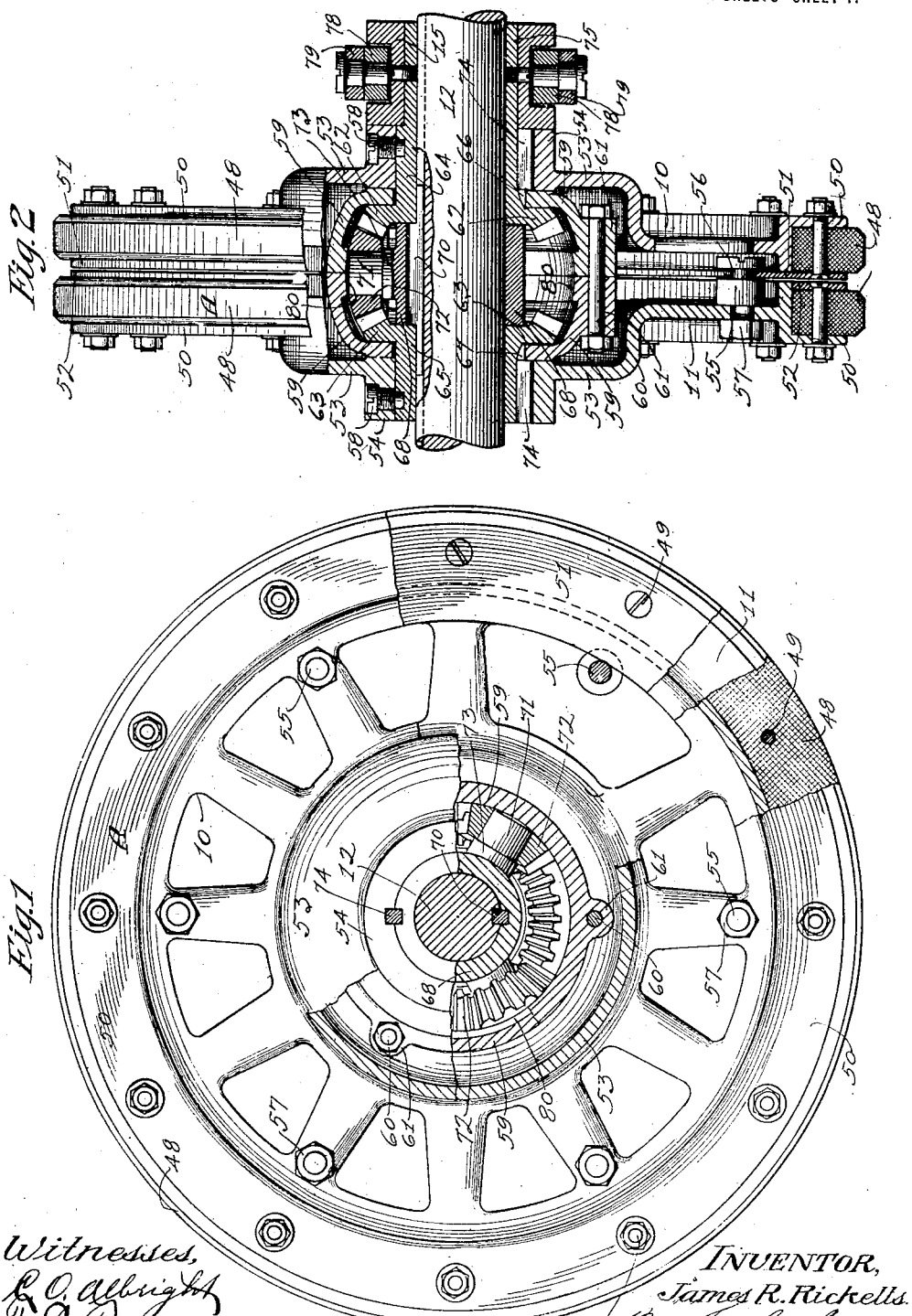

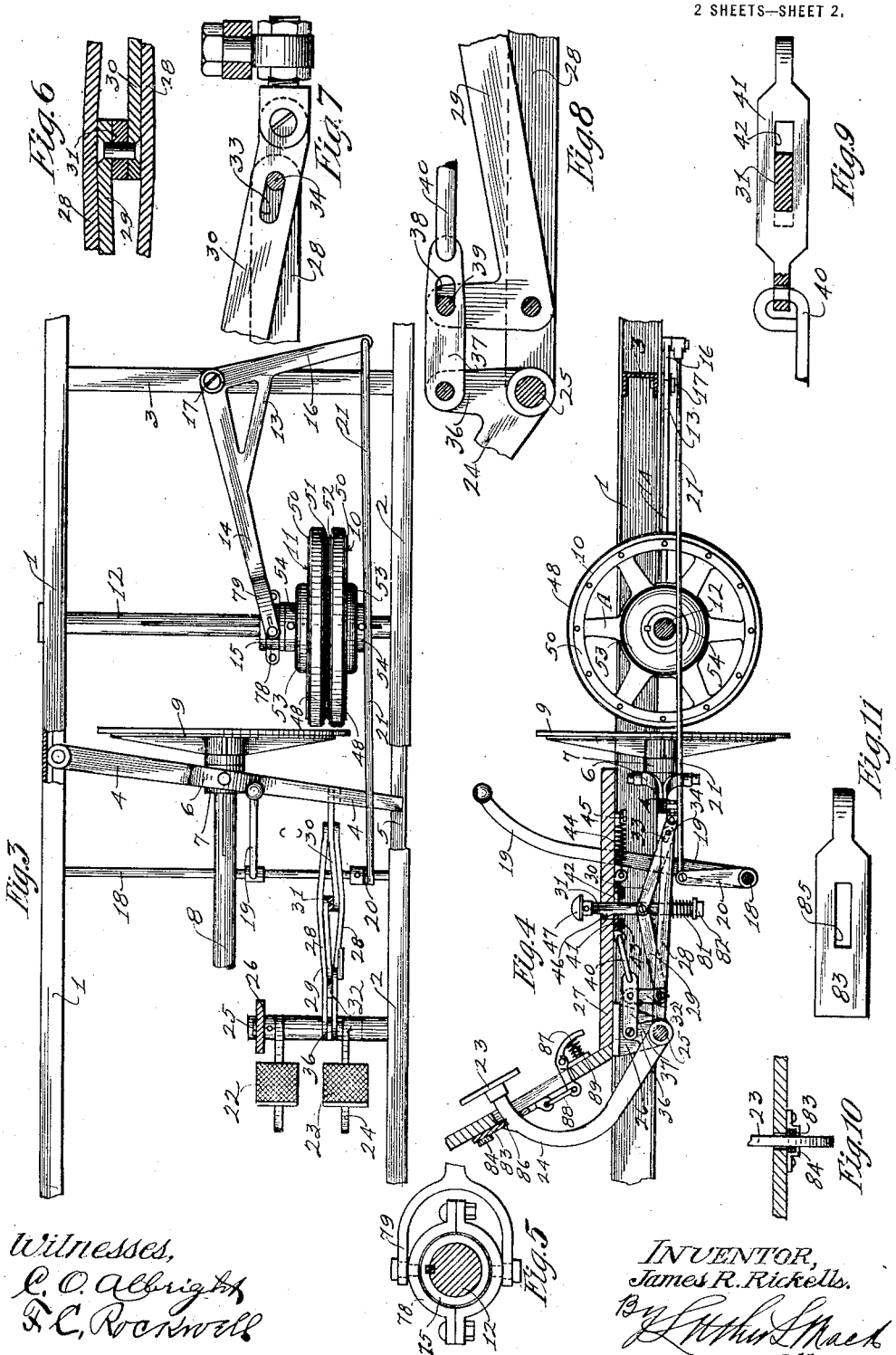

JAMES R. RICKETTS, OF LONG BEACH, CALIFORNIA.

POWER-TRANSMISSION MEANS AND CONTROL THEREFOR.

1,348,822. Specification of Letters Patent. Patented Aug. 3, 1920.

Application filed May 7, 1917. Serial No. 168,304.

*To all whom it may concern:*

Be it known that I, JAMES R. RICKETTS, a citizen of the United States, residing at Long Beach, in the county of Los Angeles and State of California, have invented new and useful Improvements in Power-Transmission Means and Control Therefor, of which the following is a specification.

My invention relates to means for applying power from a driving to a driven element, and particularly to what is generally known in the art as a gearless transmission by means of which the application of power to the driven element is accomplished through the frictional engagement of the driving element with the driven element.

I am aware that the broad idea of applying the power through frictional contact of the driving and driven elements is old and in common use, but the present invention includes means for rendering the application of power more direct and positive, and for providing a more elastic mechanism which may be capable of greater efficiency and economy than other well known types of devices.

The well known form of friction drive transmission, such as is employed on one or more types of modern motor vehicles, is composed of a driving element of substantially large diameter and having a smooth steel face which is engaged by a relatively wide rim on the driven element, the driven element, in such cases, operating in a plane at right angles to that of the driving element. The driven element is adapted to be moved longitudinally of its axis and transversely of the axis of the driving element for varying the speed and changing the direction of rotation thereof, and it will be understood that points on the face of the driving element at different distances from its axis will rotate at different speeds, thus causing a slippage or wear on the friction rim of the driven element and preventing the full power of the friction to be exerted thereon.

The primary object of the present invention is, therefore, to provide a frictional transmission driving means by means of which the difference in speed of different points on the face of the driving element may be compensated for and a greater efficiency thus provided.

A further object is to provide a driven element composed of two or more differentially related friction elements for engagement with the face of the driving element, said elements being loosely mounted on a common axis and operable independently of and with a common central element on and movable with the same shaft.

A further object is to provide means for moving one of the transmission elements from an operative plane relative to the other element and into engagement therewith for regulating the application of power thereto.

A further object is to provide means for locking the driving and driven elements in operative relation, at will, and means connected therewith for releasing said elements partially or wholly, as may be necessary.

A further object is to provide means for holding the transmission elements in a normal degree of engagement without any attention of the operator and means for changing the relation of said elements so as to increase the friction therebetween at times when such action may be necessary to care for a load above the normal. Other objects will appear as the description progresses.

Referring to the drawings, Figure 1 is an elevation of the differential driven element of my invention, partly in section. Fig. 2 is a sectional elevation of the same. Fig. 3 is a plan of a portion of an automobile frame showing the application of my device to a vehicle of this character. Fig. 4 is an elevation of the same. Fig. 5 is a section of the driven shaft and operating means for the driven element thereon. Fig. 6 is an enlarged fragmentary section of the toggle control bars. Fig. 7 is a side elevation of the rear portion of the toggle bars. Fig. 8 is a similar view of the forward ends of the same and the clutch lever. Fig. 9 is a plan of the toggle locking device. Fig. 10 is a section of the foot board of the vehicle showing the locking device for the operating lever. Fig. 11 is a plan of the lock therefor.

Similar characters of reference are employed in the specifications and throughout the several views of the drawings for indicating the same or like parts.

Referring particularly to Figs. 3 and 4, 1 and 2 represent, respectively, the longitudinal frame members of a well known type of motor vehicle, to which, for purposes of illustration, my invention is shown applied; 3 is a transverse member of the frame connected with members 1 and 2 near the rear end of the vehicle, 4 is a shifting lever pivotally attached to member 1 of the frame and slidable at the other end in a guide piece 5 attached to member 2, the central portion of the lever having a circular enlargement 6 with an opening therethrough to receive a shift collar 7 keyed to the engine draft shaft 8 on which is mounted at the end the driving disk 9.

A represents the driven element which is composed of two or more differentially related friction wheels 10 and 11 mounted on a transverse driven shaft 12 supported at the ends on the members 1 and 2 of the frame and adapted to frictionally engage the rear face of the driving disk 9. 13 is a shifter having the form of a bell crank, the arm 14 of which is pivotally connected with a suitable shift collar 15 on shaft 12 for moving the driven element A longitudinally of shaft 12 and the shifter being pivotally supported at the junction of arms 14 and 16 on a pin or screw 17 attached to member 3 of the frame.

18 is a transversely disposed shift rod which is supported on members 1 and 2 of the frame, or otherwise and carries a main shift lever 19 extending upwardly into the body of the vehicle and an arm 20 which is connected with arm 16 of bell crank 13 by means of a rod 21, thus the movement of the shift lever 19 by the operator will effect the transverse movement of the driven element A over the face of the driving disk 9, and it will be understood that such movement of the element A will vary the speed thereof according to the extent of movement. When element A occupies the position shown in Fig. 3 a maximum speed will be provided therefor and as the element is moved toward the center of disk 9 the speed will be gradually decreased until the center of the disk is reached. A movement of the driven element over the center of disk 9 will, of course change the direction of rotation of this element and reverse the movement of the vehicle correspondingly.

22 is a brake operating pedal for the vehicle, the connections with the brake drums being omitted, and 23 is the main clutch operating pedal for moving the disk 9 into engagement with the driven element A. Pedal 23 is mounted on a lever 24 pivotally supported on a short transverse shaft 25 supported at the ends in bearings attached to or formed on the member 2 of the frame and a suitable bracket 26 attached to the lower side of the vehicle floor 27, on which shaft the brake pedal lever may also be pivoted.

The connection between the operating lever 24 and the shift lever 4 consists of a pair of substantially horizontal bars 28 pivotally supported at the forward end on shaft 25, to which bars are pivotally attached at points near shaft 25 and lever 4, respectively, bars 29 and 30 which are commonly connected at their adjacent ends to a vertically slidable bar 31, the end of bar 29 adjacent shaft 25 being pivotally fixed to bars 28 and extended, as at 32, substantially above its fulcrum point, and the opposite end of bar 30 being provided with a slot 33 in which the pin 34 attached to bars 28 is adapted to move, for purposes hereinafter described. The extremity of bar 30 is pivotally attached to an adjusting screw or bolt 34 which is held in a sleeve pivoted to lever 4 and is capable of adjustment relative thereto by means of nuts 35.

The operating pedal lever 24 has a short upwardly directed extension or arm 36 which is pivotally attached at the forward end to a link 37 and at a point slightly to the rear thereof a slot 38 is provided in the link which is engaged by a pin 39 in arm 32 of bar 29. The rear end of link 37 is pivotally attached to a rod 40 which is connected with the forward end of a locking plate 41 for vertical bar 31, a slot 42 being provided in the plate 41 to receive the bar 31 and the plate being supported in suitable straps 43 attached to the lower side of the floor of the vehicle. The rear end of plate 41 is connected with a spring 44 which is attached at its opposite end to a pin 45 extending downwardly from the floor and the spring serves to hold the plate 41 normally to the rearward extreme of its movement.

A shoulder 46 is formed on vertical bar 31 which is adapted to engage the lower side of plate 41 at the forward end of the slot 42 when the head 47 of the bar is depressed by the operator for lowering the toggle bars 29 and 30 into a common horizontal plane for providing a maximum friction between the driving and driven elements, as will hereinafter appear.

The driven element A comprises wheels 10 and 11 which have demountable and replaceable friction rims 48, of wood fiber or similar substance, which are held thereon by means of bolts 49 extending through the wheel flanges 50 and inner removable plates or rings 51 and 52, as the case may be. The inner portions of the wheels have substantially enlarged solid webs 53 and hubs 54 extending outwardly therefrom, the inner portions of the wheels being connected with the rims by means of suitable spokes. The two wheels are prevented from axial movement relative to each other by means of a plurality of bolts 55 provided with annular grooves 56 which are adapted to engage the inner periphery of ring 51 of wheel 10 and the ends of the bolts are threaded into or extended through the spokes of the wheel 11 and held thereon by means of nuts 57. In lieu of the bolts 55, set screws 58, as shown in Fig. 2, may be provided for holding the wheels in proper relation, the inner ends of the screws, in such case, engaging annular grooves in the member on which the hubs of the wheels is mounted.

Within the housing of the wheels 10 and 11 I provide a gear case 59 which is composed of two similar and separable members attached together at a plurality of points by means of bolts 60 extending through lugs 61. Bevel gears 62 and 63 are housed in the case 59 in contact with the inner ends thereof and have hubs 64 and 65, respectively, which are extended through opposite openings 66 and 67 in the ends of the gear case. Between the gears 62 and 63 a spider 68 is mounted on the transverse driven shaft 12 and is keyed to this shaft by means of a key 70 having elongated ends flush with the periphery of and seated in a suitable keyway in the shaft. Stems 71 are integrally formed on the spider 68 at a plurality of points and extend radially from the axis thereof and carry bevel pinions 72 thereon which rest against the inner shoulders 73 of the stems and mesh with the larger gears 62 and 63.

The hubs 64 and 65, respectively of gears 62 and 63 are rotatively connected with the wheels 10 and 11 by means of suitable keys 74 and hub 64 is substantially elongated and reduced at the end 75 to receive a shift collar 15 which may be rotatively connected with the gear hub by means of pins or screws 76, or otherwise, an annular groove 77 being formed in the collar 15 which is engaged by a split collar 78 pivotally attached at diametrically opposite points to yoke 79 of shift lever 13 which serves to move the wheels 10 and 11 longitudinally of shaft 12, as stated.

When the wheels 10 and 11 of driven element A are in frictional engagement with driving element 9, gears 62 and 63 will be rotated on but not with shaft 12 necessarily, and at slightly different speeds because of the different positions of the wheels 10 and 11 on the disk 9. Pinions 72 on spider 68 will rotate in such event slightly and to an extent corresponding to the difference in speed between wheels 10 and 11, these pinions, at the same time, being rotated, together with the spider 68 about the shaft 12 and thus rotating shaft 12 correspondingly. The outer surfaces of the pinions are preferably curved to conform to the inner rib 80 formed on the interior of the gear case so that they may thus be held in proper position on the stems and in proper mesh with gears 62 and 63.

From the above description it will be noted that the wheels 10 and 11 differentiate with respect to each other during their rotation and one of the wheels will always rotate at a slower speed than the other, thus producing a planetary movement of the pinions as well as a rotary movement on their individual axes. Such action prevents undue wear on the relatively narrow frictional rims of the wheels and renders the operation thereof economical and more efficient than a single wheel with a relatively wide rim such as heretofore used on vehicles of this character.

In ordinary differentials such as are used on the rear axles of motor vehicles, it is to be understood, that the gears of the set are keyed on separate shafts in axial alinement and the pinions are mounted loosely on the shaft; while in my device, the reverse is true, the gears 62 and 63 being loose on the shaft 12 and the spider carrying the pinions is tight thereon. This difference is essential to the successful operation of my device, for only a single driven shaft is provided, whereas in other types of differentials independent shafts are employed for each of the rear wheels.

In operation, the disk 9 is adapted to be normally held in engagement with the wheels 10 and 11 by means of a spring 81 carried on the lower end of vertical bar 31 and adapted to compress between the bars 28 and the head 82 adjustably carried on bar 31, and when so held, the toggle bars 29 and 30 will occupy planes almost but not quite in horizontal alinement, the tension of spring 81 serving to maintain such relations between these elements. Vertical bar 31 under such conditions, will be almost completely depressed so that the shoulder thereon will almost but not quite extend below the lower side of the locking plate 41 and clutch operating pedal 23 will be extended inwardly from the vehicle foot board.

In the operation of the vehicle, when a steep hill is reached or an increased effort is required on the part of the motor, bar 31 may be depressed by the foot of the operator until the shoulder 46 thereon engages the lower side of plate 41, thus alining the bars 29 and 30 of the toggle joint horizontally and locking them in such position for creating a maximum friction between disk 9 and wheels 10 and 11. The sliding connection between link 37 and arm 32 of bar 29 consisting of pin 39 and slot 38, permits the release of bar 31 from plate 41 by a slight pressure on pedal 23 of lever 24.

The movement forward of lever 24 and pedal 23, as in the case of other forms of transmission clutches, serves to disengage the disk 9 from wheels 10 and 11 by means of the connection of link 37 with arm 32 of bar 29 and arm 36 of lever 24. It will be observed that in this form of device, it will be necessary to lock the lever 24 in its lowermost position when the engine or motor is started, and for this purpose I provide a locking plate 83 slidably held on the lower side of the vehicle foot board in straps 84. A slot 85 is formed in this plate through which lever 24 operates and a shoulder 86 is formed on the upper end of the lever which is adapted to engage the lower side of the plate, as in the case of bar 31 and plate 41.

A heel lever 87 is pivotally supported on the upper side of the foot board which is connected by means of a link 88 with the lower end of plate 83, so that when the heel lever is depressed, the lower arm thereof will move the plate 83 upwardly for releasing the lever. A spring 89 is provided for action against heel lever 87 so as to normally hold the lever 23 locked against action.

The locking plate 83, in addition to locking the lever 23 against action when the engine is started, may be used for holding the disk 9 out of engagement with the friction wheels 10 and 11 at any time when it is desired to stop the vehicle without stopping the engine, and it will be observed that with the provision of locking plates 41 and 83, the friction elements may be locked at both extremes of action, namely, in and out of engagement with each other, thus affording positive action in the one case and positive disengagement in the other.

While I have shown my improved transmission mechanism as applied to a modern type of motor vehicle for illustrating the valuable features thereof, it must be understood that the same may be applied with an equal degree of efficiency to other forms of machinery, and in such case, it may be necessary to modify the controlling devices to meet peculiar conditions obtaining at the place of installation and depending upon the character of the machinery to which the improvements may be applied.

Having thus described my invention, what I claim as new and desire to secure by Letters Patent, is:

1. In a transmission mechanism, a driven shaft, a plurality of driven elements concentrically on and for rotating said shaft, differential gearing connecting said driven elements, and means for holding said driven elements in abutting positions for inclosing said gearing.

2. In a transmission mechanism, a driven shaft, a plurality of driven elements adapted to rotate said shaft, differential gearing operably connecting said driven elements with each other and with said driving shaft, and means intermediate said driven elements for maintaining said driven elements together, for inclosing said gearing.

3. In a transmission mechanism, a driven shaft, a plurality of driven elements operably held thereon, differential gearing connecting said driven elements and said shaft, an annular member fitting the space between said driven elements for forming a closed chamber therebetween, and means on one of said driven elements engaging said annular member for maintaining said elements in closed relation.

4. In a transmission mechanism, a driven shaft, a plurality of driven elements rotatable thereon, differential gearing operably connecting said driven elements with said shaft, a housing inclosing said gearing, and means whereby said driven elements may be held together for forming an outer housing around said gearing housing.

5. A transmission device including in combination, a driving element, a driven element operable thereby, primary and secondary members for engagement with and disengagement from said driving element, and a toggle connection between said primary and secondary members for operating said secondary member.

6. A transmission device including in combination, a driving element, a driven element operable thereby, primary and secondary means for regulating the engagement between said driving and driven elements, a toggle connection between said primary and secondary operating means, and means for locking said connection for positively engaging said elements.

7. A transmission device having in combination, a driving element and a driven element, primary and secondary control means for the driving element, toggle bars intermediate of and connecting said control members, and means for locking said bars in alinement for maintaining a positive engagement between said driving and driven elements.

8. A transmission device having in combination, a driving element and a driven element, control means for said driving element, toggle bars connected with said control means for normally maintaining said elements in resilient engagement, and means connected with said toggle bars for locking said elements in positive engagement.

9. A transmission device having in combination, a driving and a driven element, control means for regulating the engagement therebetween, a toggle connection with said control means, means for normally maintaining said toggle in approximate alinement and said elements in yieldable engagement, and means connected with said toggle for locking said toggle in positive alinement and said elements in engagement, at will.

10. In a transmission device, the combination of a driving element, a driven element for engagement therewith, means for moving one of said elements into and from engagement with the other including a toggle connection comprising bars pivoted together for action, means for resiliently holding said bars in approximate alinement, and means for moving said bars into alinement and for positively locking the same for providing a maximum engagement between said elements.

11. In a transmission device, the combination of a driving element, a driven element capable of rotation thereby, primary and secondary control means for regulating the engagement of said elements, toggle bars intermediate of said primary and secondary control means, means for holding said toggle bars yieldably in approximate alinement, and means for moving said bars into alinement and for positively locking the same.

12. In a transmission device, the combination of a driving element, a driven element capable of rotation thereby, primary and secondary operating means for regulating the engagement of said elements, toggle bars intermediate of said primary and secondary operating means and connected therewith, means for yieldably holding said bars in approximate alinement, means for locking said bars in positive alinement, and means for locking said operating means against action for maintaining the disengagement of said elements.

13. In a transmission mechanism, a driving shaft, a driven shaft supported at right angles to said driving shaft, differential gearing operably carried on said driven shaft, a plurality of rotatable elements operably connected with said differential gearing and adapted to be engaged and disengaged at will relative to said driven shaft, a housing inclosed by said rotatable elements for inclosing said differential gearing, and means for holding said rotatable elements together, as set forth.

14. In a transmission gearing comprising a yieldably supported driving element, a plurality of differentially related driven elements movably supported in a plane parallel to the face of said driving element, means for moving said driving element into operative engagement with said driven elements, and a toggle locking device for positively locking said elements together for operation.

Signed at Los Angeles, in the county of Los Angeles and State of California, this 13th day of April, 1917.

JAMES R. RICKETTS.

Witnesses:
C. J. WELLS.
JAS. BRUNKEN.